Sept. 30, 1952 W. B. McGUIRE 2,612,278
INSTALLATION FOR COLLECTING AND HANDLING FIBROUS WASTE MATERIAL
Filed May 5, 1949

INVENTOR
Winston B. McGuire
BY
AGENT

Patented Sept. 30, 1952

2,612,278

UNITED STATES PATENT OFFICE 2,612,278

INSTALLATION FOR COLLECTING AND HANDLING FIBROUS WASTE MATERIAL

Winston B. McGuire, New York, N. Y., assignor to P. O. M. Company, New York, N. Y., a partnership firm Application May 5, 1949, Serial No. 91,442

1 Claim. (Cl. 214—16)

My invention relates to an installation for collecting and handling fibrous waste material resulting from carding and/or other operations, and more particularly to an improvement of installations of the type in which fibrous waste material, preferably segregated as to different kinds, is gathered at certain processing stages and transported by mechanical means, for example pneumatically, into one or more collectors. Such collectors comprise a closed tank or other receiver provided with a door or similar closure the receiver being connected to a vacuum pump which draws fibrous waste into the receiver by a pipe line or a plurality of pipe lines which connect said receiver with one or more places of a textile mill from where fibrous waste is to be removed and collected. The thus collected fibrous waste is thereafter emptied from said tanks or receivers into carriages or the like and removed for baling and/or reprocessing.

The known installations of said type have many disadvantages. One disadvantage consists therein that the waste material assembled in said collecting tanks or receivers which are of quite limited capacity, has to be carried away separately every time the said collector is emptied. Another disadvantage consists therein that no appropriate provisions are made to store separately and in easy manner waste material of different kind i. e. of different qualities and/or color.

The principal object of my invention is to overcome the above mentioned disadvantages. This and other objects of the invention will be more fully understood from the following specification when read together with accompanying drawing in which one embodiment of my invention is illustrated.

Figure 1:
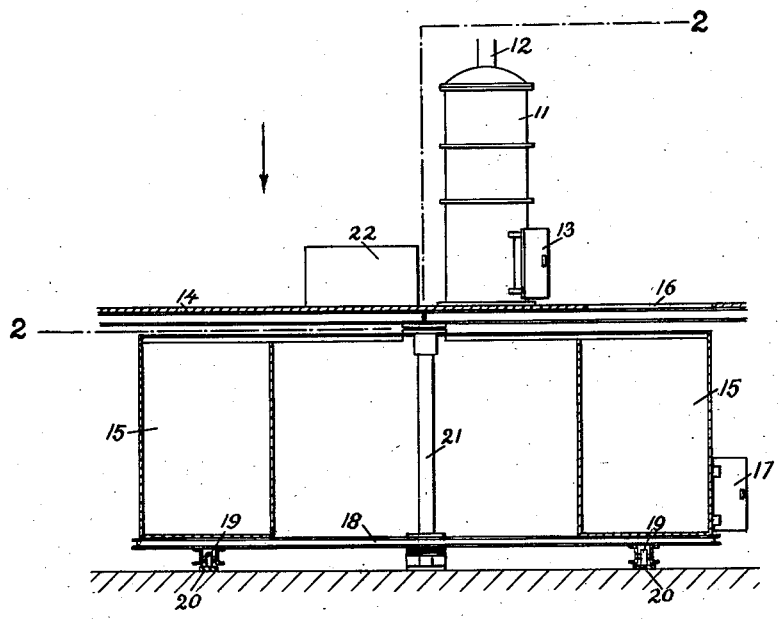
Fig. 1 shows a longitudinal section along the broken line 1—1 in Fig. 2.
Figure 2:
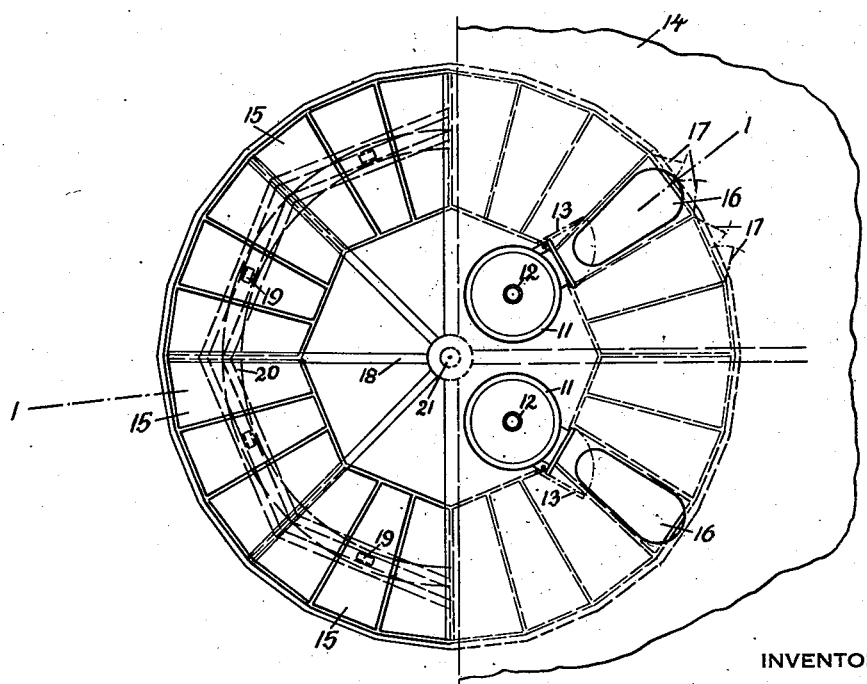
Fig. 2 shows in its left half a horizontal section along the broken line 2—2 in Fig. 1 and in its right half a top view of my new installation.

In the embodiment shown in the drawing 11 indicates receivers or tanks of the so called Abington type of which one or more are used in the installation. Each receiver 11 has a door or other closure 13, which closes the same hermetically and through which the receiver may be emptied, and each receiver is connected with a suction pipe line 12 coming from different places of the mill and carrying waste material into said receiver. The receivers 11 and the suction pipe line 12 are operated by a sucking or vacuum pump 22 attached thereto.

The said receivers 11 are placed upon a platform or other horizontal partition 14 and if a plurality of such receivers is used then they are arranged concentrically around the revolving axis of the carousellike container or bin assembly situated below said platform 14. This assembly comprises a plurality of concentrically arranged containers or bins 15 supported by a framelike or other revolvable structure 18 which may be turned around a central pillar 21 and rests upon a plurality of wheels 19 moving upon a circular track 20. Openings 16 are arranged in the platform 14 in front of the receiver doors 13 and permit waste material to pass therethrough into the top open containers or bins 15 each of which may be emptied through its door or other closure 17.

The installation operates as follows:

Fibrous waste is drawn through one or more suction pipe lines 12 each of which is connected to a collecting tank or receiver 11. Each pipe line 12 originates at a different place of the mill to collect fibrous waste material from different processing machines or different places. The suction pipe lines 12 and the receivers 11 are operated by a common suction or vacuum pump 22 connected to each receiver.

The said receivers 11, of which two are shown in the drawing, are located upon a platform or other horizontal partition 14. Below said platform 14 is the carousellike container or bin assembly comprising a plurality of containers or bins 15 concentrically arranged upon the revolvable structure 18. The said containers or bins 15 are top open and cooperate with openings 16 arranged in the platform 14 in front of the receiver doors or the like 13.

The fibrous waste material, mostly of different kind, is sucked separately in each of the closed receivers 11. It is removed therefrom through the doors 13 and falls through the opening 16 situated in front of said doors in one of the top open containers or bins 15. Each of these containers 15 has preferably a much larger capacity than the receivers 11 capable to receive at least a quantity of waste as usually made up into a bale, and each container, or group of containers, is used for receiving and storing waste of different kind. By revolving the bin assembly the proper bin 15 may be brought to cooperation below the proper opening 16. The waste material assorted and stored in the bins 15 is removed therefrom through the doors or the like 17 and is emptied directly into a baling press, or presses, situated close to the carousellike container or bin assembly, or is taken for further processing.

Although I have shown and described only one embodiment of my invention, I am fully aware that many modifications thereof are possible. My invention, therefore, is not to be restricted except insofar as is necessitated by the prior art and by the spirit of the appended claim.

What I claim as my invention is:

In an installation for the centralized collection of different fibrous waste materials from outlying locations and the classification and storage of the different waste materials, the combination comprising spaced upper and lower horizontal walls; a vertical pillar extending between said walls; a substantially circular horizontal platform adjacent said lower wall and rotatable about said pillar as an axis; means, including a circular track concentric with said platform and rollers travelling said track, supporting said platform on said lower wall; a circumferential series of open top bins fixed around the periphery of said platform and extending toward said upper wall, the inner periphery of said series of bins being spaced substantially from said pillar; at least one stationary waste receiver supported on said upper wall between the inner periphery of said bin series and said pillar and connected to waste lines leading to the outlying location; and means on said upper wall connected to said receivers to draw material through the waste lines into the receiver; said upper wall being formed with openings each aligned radially with a receiver and vertically with the series of bins and extending between the inner and outer peripheries of said bin series, each receiver having a side discharge opening aligned with the associated upper wall opening; whereby said platform may be rotated to align a selected bin with a selected upper wall opening to receive material from the receiver associated with the selected wall opening.

WINSTON B. McGUIRE.

REFERENCES CITED

The following references are of record in the file of this patent:

UNITED STATES PATENTS

| Number | Name | Date |
|---|---|---|
| 446,029 | Smith | Feb. 10, 1891 |
| 648,269 | Lamb | Apr. 24, 1900 |
| 1,342,418 | Brahtz | June 8, 1920 |
| 1,593,665 | Moores | July 27, 1926 |
| 2,379,371 | Moschel et al. | June 26, 1945 |
| 2,474,205 | Welty | June 21, 1949 |